United States Patent
Laine

(10) Patent No.: US 9,279,876 B2
(45) Date of Patent: Mar. 8, 2016

(54) SYSTEM FOR ORIENTING AND POSITIONING AN ELECTROMAGNETIC RECEIVER

(75) Inventor: Robert Laine, St. Xandre (FR)

(73) Assignee: ASTRIUM SAS, Suresnes (FR)

( * ) Notice: Subject to any disclaimer, the term of this patent is extended or adjusted under 35 U.S.C. 154(b) by 460 days.

(21) Appl. No.: 13/879,705

(22) PCT Filed: Oct. 6, 2011

(86) PCT No.: PCT/FR2011/052334
§ 371 (c)(1),
(2), (4) Date: Jun. 5, 2013

(87) PCT Pub. No.: WO2012/052651
PCT Pub. Date: Apr. 26, 2012

(65) Prior Publication Data
US 2013/0241773 A1    Sep. 19, 2013

(30) Foreign Application Priority Data
Oct. 19, 2010    (FR) ...................................... 10 04094

(51) Int. Cl.
| | |
|---|---|
| *G01S 1/00* | (2006.01) |
| *G01S 1/08* | (2006.01) |
| *G01S 1/02* | (2010.01) |
| *G01S 1/10* | (2006.01) |
| *G01S 3/30* | (2006.01) |
| *G01S 5/02* | (2010.01) |

(52) U.S. Cl.
CPC ... *G01S 1/02* (2013.01); *G01S 1/10* (2013.01); *G01S 3/30* (2013.01); *G01S 5/0247* (2013.01)

(58) Field of Classification Search
CPC ................................. G01S 1/68; G01S 5/0009
USPC ............. 342/385, 386, 398, 422; 324/207.13, 324/260
See application file for complete search history.

(56) References Cited

U.S. PATENT DOCUMENTS

| | | |
|---|---|---|
| 4,396,885 A | 8/1983 | Constant |
| 6,374,134 B1 | 4/2002 | Bladen et al. |
| 2003/0156062 A1 | 8/2003 | Ripingill, Jr. et al. |
| 2006/0132352 A1 | 6/2006 | Schantz et al. |
| 2010/0309045 A1 | 12/2010 | Laine |

OTHER PUBLICATIONS

International Search Report issued in connection with PCT/FR2011/052334, International Filing Date Oct. 6, 2011, in the name of Astrium Sas.

*Primary Examiner* — Dao Phan
(74) *Attorney, Agent, or Firm* — Duane Morris LLP; J. Rodman Steele, Jr.; Gregory M. Lefkowitz

(57) ABSTRACT

A transmitting beacon (4) having at least two transmitting current loops (6.1, 6.2, 6.3) that are mutually orthogonal and capable of transmitting electromagnetic waves (5.1, 5.2, 5.3), as well as means (7) for supplying power to the transmitting current loops (6.1, 6.2, 6.3) in series is disclosed.

16 Claims, 5 Drawing Sheets

SYSTEM FOR ORIENTING AND POSITIONING AN ELECTROMAGNETIC RECEIVER

CROSS-REFERENCE TO RELATED APPLICATIONS

This application is a §371 national stage entry of International Application No. PCT/FR2011/052334, filed Oct. 06, 2011, which claims priority to FR Application No. 1004094, filed Oct. 19, 2010, the entire contents of which are incorporated herein by reference.

FIELD OF THE INVENTION

The present invention relates to a system for determining the orientation and positioning of an electromagnetic receiver.

BACKGROUND OF THE INVENTION

It is known that satellite navigation systems generally allow terrestrial users to determine their position and possibly their altitude.

Nevertheless, there are terrestrial zones that satellite navigation systems cannot access, either because the considered location (underground, tunnel, building, dense forest, etc.) is too opaque for the signals that they transmit to be properly received by a receiver or because these systems have not yet been installed.

However, such information can prove to be particularly useful for users provided with an item of equipment that integrates a receiver in so far as this orientation information allows them to easily find their location, the orientation system being capable, for example, of acting as a compass or even a guide to easily find the location of the emission beacon.

SUMMARY OF THE INVENTION

Therefore, the object of the present invention is a system for orienting an electromagnetic receiver relative to an emission beacon, which system can provide correct information relating to the orientation of said receiver, without resorting to the use of satellite navigation systems.

DETAILED DESCRIPTION OF THE INVENTION

To this end, according to the invention, the aforementioned system for orienting an electromagnetic receiver, in a location where the signals from satellite navigation systems cannot be received, relative to an emission beacon that is disposed around said location, outside of said location, is noteworthy in that said emission beacon comprises:
- at least two emitting current loops that are mutually orthogonal and are capable of emitting electromagnetic waves, and
- means for sequentially supplying power to said emitting current loops.

Therefore, due to the invention, an alternative to satellite navigation systems is provided whilst ensuring that the receiver has sufficient information to unambiguously determine its orientation relative to the emission beacon.

In effect, it will be understood that an emitting current loop, which is capable of generating electromagnetic radiation in the form of field lines in the form of closed curves, only allows the orientation of the electromagnetic receiver to be provided relative to these field lines insofar as there is an univocal relationship between the orientation of the receiver (determined by the angle between the receiver and the emission beacon) and the directions of these lines at the electromagnetic receiver. However, the field lines of an emitting current loop are generally closed curves, so that the direction of the field that is received by the electromagnetic receiver depends not only on the position of said receiver but also on the orientation of the current loop. Furthermore, on these different field lines, the vocation of the points that have parallel tangents is also a curve and not a straight line. It follows that, for a direction of the magnetic field that is generated by a single current loop, the orientation of the electromagnetic receiver relative to the emission beacon depends on two unknowns, namely, the direction of the considered emitting current loop and the orientation of the receiver, and this constitutes two degrees of freedom. With regard to the electromagnetic receiver, it only provides a singe measurement result, that is a single degree of freedom, which therefore does not allow the orientation to be precisely accessed.

However, the Applicant has found that, with at least two emitting current loops that are mutually orthogonal, there is a monotonic relationship between, on the one hand, the direction of the electromagnetic receiver relative to the emission beacon and, on the other hand, the difference in the angles that are formed by the magnetic field lines that are generated by these current loops and are measured separately from each other by the electromagnetic receiver.

Therefore, from at least two orthogonal current loops that are controlled alternately, but within a sufficiently close period of time for the electromagnetic receiver to be considered to be fixed in this interval, the electromagnetic receiver has, for the same geometric configuration, a plurality of measurements, the combination of which is independent of the orientation of the user, so that a sufficient number of parameters is obtained in order to unambiguously determine the orientation of the electromagnetic receiver.

It will also be understood that the invention resides not only in the multiplicity and the specific arrangement of the current loops within the same emission beacon, where the use of only one was previously known, but also in their power supply. Indeed, if two current loops are simultaneously supplied with power, the information that is received by the electromagnetic receiver is confused and the resulting magnetic field therefore does not provide a single additional parameter. On the contrary, the invention proposes the successive power supply of each current loop within the some emission beacon, which precisely prevents the information that is received by the receiver from being confused and thus unable to be used.

Advantageously, the sequential power supply means are arranged so that, during each sequential power supply phase, each emitting current loop is successively supplied with power with a view to emitting an electromagnetic wave, the other emitting current loops being disposed in an open circuit. This therefore prevents the current that circulates in a first emitting current loop from inducing, in second current loop, the creation of a non-zero phase-shifted stray current that can generate a stray magnetic field that is capable of combining with the magnetic field of the first loop, which would then result in a magnetic field that would depend on the generated stray current and which would not enable the orientation of the electromagnetic receiver to be precisely determined.

Each emitting current loop can have a low stray capacitance, the advantage of which is to make the impedance of each emitting loop high at the operating frequency of the emission beacon.

Preferably, the sequential power supply means are provided with at least one switching circuit that is arranged to sequentially switch each of the emitting current loops. By virtue of such an electronic circuit, it is possible to carry out a command of the following type: transmission of an electromagnetic wave, then switching to the next emitting loop, then transmission of a new electromagnetic wave, etc. In this way, the emission frequency can be constant, which enables the electromagnetic spectrum that is used to be limited to a band that is narrow enough with a view to reducing the sensitivity to electromagnetic noise.

Advantageously, the aforementioned switching circuit, in its non-active state, has a high output impedance.

Preferably, the sequential power supply means are arranged so that, during each sequential power supply phase, the successive power supply of the emitting current loops occurs at a predetermined rate as a function of a possible displacement of the electromagnetic receiver. Thus, the sequential power supply rate can be adapted to the displacements of the electromagnetic receiver so that said electromagnetic receiver can be considered to be fixed between a plurality of successive measurements and so that the angles of the field lines that are measured by the electromagnetic receiver are thus correctly correlated to the direction of said receiver relative to the emission beacon.

In order for the emission beacon to transmit the electromagnetic waves within a location that is opaque to the signals of satellite navigation systems, the emission wavelength of each emitting current loop is at least decametric.

In order for the electromagnetic receiver to determine its orientation relative to the emission beacon, the electromagnetic receiver is associated with means for processing electromagnetic waves that are emitted by the emitting current loops and received by said electromagnetic receiver, said processing means being capable of:
  correlating the difference between the angles formed by said electromagnetic waves, at the electromagnetic receiver, with the direction of said receiver relative to the emission beacon, and
  determining the orientation of the electromagnetic receiver relative to the emission beacon on the basis of said correlation.

When the number of emitting current loops of the emission beacon is equal to two the emission is carried out in a plane, which allows the orientation of the electromagnetic receiver to be known in said plane.

However, when the number of emitting current loops of the emission beacon is equal to three, the difference in the angles of the sequential magnetic field measured by the electromagnetic receiver can be directly correlated with the direction cosines of the orientations in the space of the receiver relative to the respective axes of the emitting current loops, which makes it possible to determine the orientation of an electromagnetic, goniometric and three-dimensional receiver in the space. Furthermore, if the orientation of the receiver is sought only in a two-dimensional plane, the third emitting current loop provides a third item of information, which is redundant relative to the information that is provided by the first two emitting current loops, which therefore makes determining the orientation of the electromagnetic receiver self-checking.

When the orientation system according to the invention is further designed for positioning the electromagnetic receiver in a location, this system has the following special features:
  it comprises at east one additional emission beacon, comprising:
    at least two emitting current loops that are mutually orthogonal and are capable of emitting electromagnetic waves, and
    means for sequentially supplying power to said emitting current loops,
  the set of emission beacons being distributed around the location, and outside of said location,
  the electromagnetic waves that are emitted by each emission beacon comprising information relating to the terrestrial position of the emission beacon, and
  the processing means are capable of:
    correlating, for each emission beacon, the difference between the angles that are formed by the electromagnetic waves, at the electromagnetic receiver, with the direction of the receiver relative to the corresponding emission beacon,
    determining the orientation of the electromagnetic receiver relative to each emission beacon on the basis of said correlation, and
    determining the position of the electromagnetic receiver in the location on the basis of said orientations and of the terrestrial position of each emission beacon.

In fact, on the basis of the measurement of the apparent angles of the two magnetic fields that correspond to the two emitting current loops of an individual emission beacon, it is possible to obtain the orientation of the electromagnetic receiver relative to said individual emission beacon. In this way, with two emission beacons disposed around the location, the position of this electromagnetic receiver is obtained at the intersection of the two straight lines that correspond to the two respective orientations of the two individual emission beacons.

Preferably, in order to improve the precision of the positioning of the user, the aforementioned orientation system comprises at least two additional emission beacons, that is a total of three emission beacons.

The invention further relates to an emission beacon that is designed to equip an orientation system according to any one of the aforementioned embodiments.

BRIEF DESCRIPTION OF THE DRAWINGS

The figures in the appended drawing provide an understanding of how the invention can be realised. In these figures, identical references designate like elements.

FIG. 1 shows a location 1 in which a user 2 is located, said user being provided with an item of equipment 3 that notably integrates an electromagnetic wave receiver 20 (shown in FIG. 6). An emission beacon 4 is disposed around said location 1, outside of said location, which emission beacon 4 is capable of emitting electromagnetic waves 5 inside said location 1, which waves can be captured by the electromagnetic receiver that is integrated into the item of equipment 3.

Figure 2:
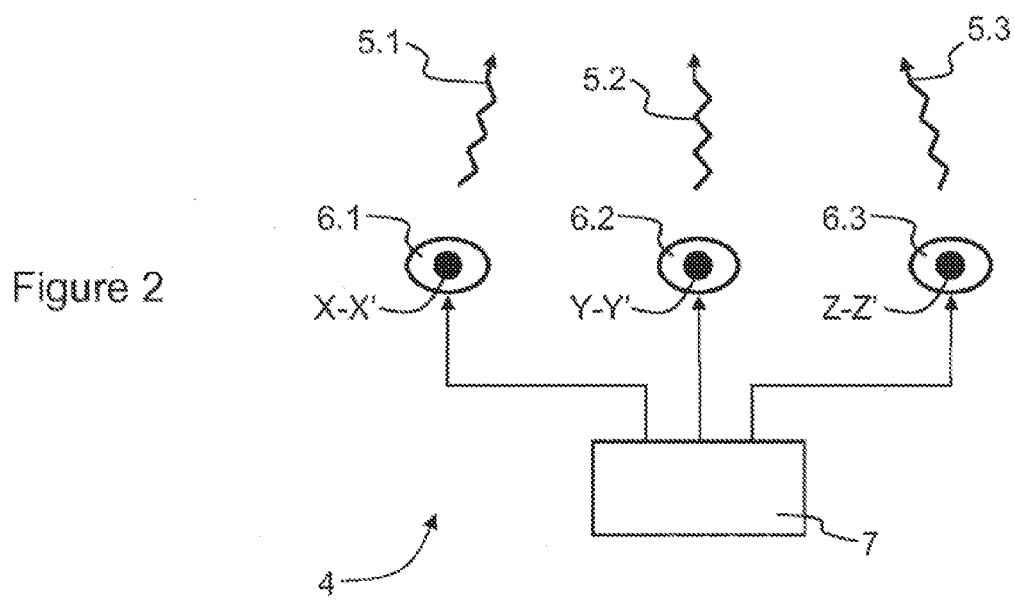
FIG. 2 shows a block diagram of an emission beacon according to a particular embodiment of the invention.

In the embodiment that is schematically shown in FIG. 2, the emission beacon 4 comprises three emitting antennae 6.1, 6.2 and 6.3, of the emitting current loop type, that are capable of emitting electromagnetic waves 5.1, 5.2 and 5.3, respectively. The emission beacon 4 further composes means 7 for sequentially supplying power to the three emitting current loops 6.1, 6.2 and 6.3.

The emission wavelength of these three emitting current loops can depend on the envisaged application. By way of example, in order to determine the orientation of an electromagnetic receiver in a location where the signals from satellite navigation systems cannot be received, the emission wavelength can be high, for example, at least decametric, in order to emit radio signals.

Figure 3:
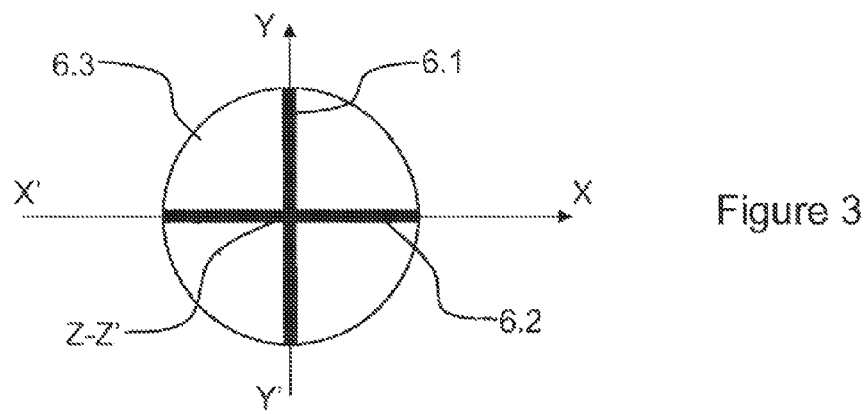
FIG. 3 is a diagram showing the respective orientations of the three emitting current loops of the emission beacon of FIG. 2.

As shown in FIG. 3, the axes of the three emitting current loops 6.1, 6.2 and 6.3 (that is, the axes that are orthogonal to the respective surfaces of the current loops), referenced X-X', Y-Y' and Z-Z' respectively, are orthogonal in pairs. More specifically, the axis of the loop 6.1, the profile of which is shown in FIG. 3 and is disposed in the plane that is formed by the Y-Y' and Z-Z' axes, is the X-X' axis. Similarly, the axis of the loop 6.2, the profile of which is shown in FIG. 3 and is disposed in the plane that is formed by the X-X' and Z-Z' axes, is the Y-Y' axis. Finally, the axis of the loop 6.3, the face of which is shown in FIG. 3 and is disposed in the plane that is formed by the X-X' and Y-Y' axes, is the Z-Z' axis.

Furthermore, in order for these three current loops to be able to emit electromagnetic waves substantially towards the receiver that is integrated into the item of equipment 3, it can be appropriate for the axis of the emission beacon 4 that points towards the equipment 3 not to be confused with any of the three axes X-X', Y-Y' and Z-Z', in which case one of the current loops will be disposed orthogonal to the axis that passes through the emission beacon 4 and the electromagnetic receiver and this current loop will tend not to be disposed in the angular operating field (described hereafter) of the orientation system according to the invention.

Figure 4:
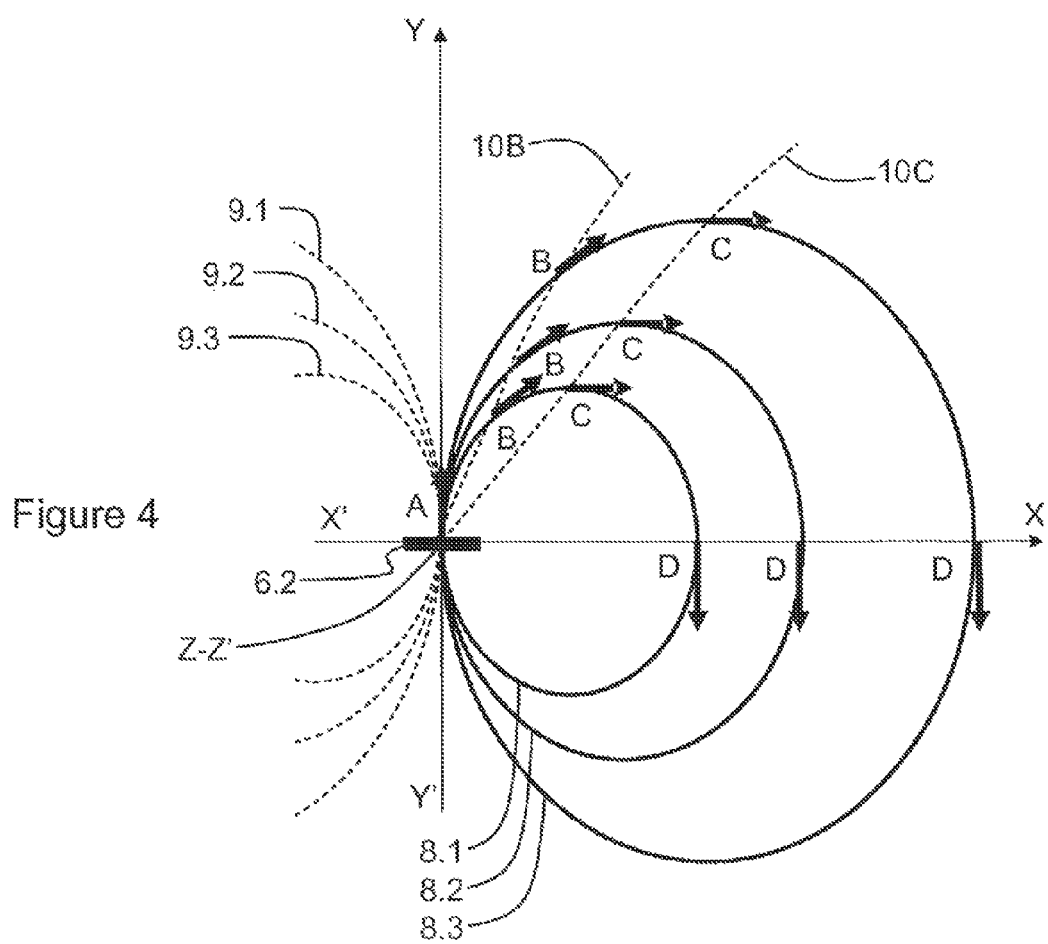
FIG. 4 is a diagram showing the spatial distribution of magnetic field lines generated by a single current loop.

The magnetic field lines (in the X-X', Y-Y' plane) that are generated by the emitting current loop 6.2, of axis Y-Y', are shown in FIG. 4. The centre of the current loop 6.2 is located at the intersection A of the X-X', Y-Y' and Z-Z' axes. By way of example, three field lines 8.1, 8.2 and 8.3 are shown to the right of the Y-Y' axis, these three field lines being symmetrical, relative to the Y-Y' axis, to three field lines 9.1, 9.2 and 9.3 (dashed line), respectively, to the left of the Y-Y' axis. Each of these field lines 8.1, 8.2 and 8.3 substantially forms a closed curve, the axis X-X' of which constitutes an axis of symmetry, and which passes through the centre A of the current loop 6.2.

Due to the curvature of these field lines 8.1, 8.2 and 8.3, the direction of the magnetic field that is received by an electromagnetic receiver that is located, for example, at point B, C or D, depends not only on the position of said receiver (i.e., of the considered point), but also on the orientation of the current loop (located at point A) relative to said receiver, which corresponds to two unknowns (the position of the receiver and the orientation of the loop) for a measurement result (orientation of the field line measured on the receiver). Indeed, for the same orientation of the magnetic field line received by the electromagnetic receiver (for example, at point B), which corresponds to the tangent to the field line (shown in the form of a vector) at this point, it is possible to determine a plurality of orientations between point A and point B, as a function of the position in and the orientation of the current loop 6.1 relative to this point B.

Therefore, the emitting current loop 6.2 does not allow a univocal relationship to be provided between the position of the electromagnetic receiver (that is determined by the angle between the receiver and the loop 6.2) and the directions of the field lines at said receiver. It is therefore difficult to deduce, without a prior hypothesis or approximation, the orientation of the electromagnetic receiver solely from the field lines of the current loop 6.2.

Furthermore, on these different field lines 8.1, 8.2, 8.3, the locations 10B and 10C of the points B and C, respectively, which have parallel tangents (i.e. collinear vectors in FIG. 4), form a curve and not a straight line, and this makes it even more difficult to precisely determine the orientation of the receiver relative to the emission beacon.

According to the invention, the emission beacon 4 notably comprises an additional emitting current loop 6.1 (FIG. 3), close to the loop 6.2, but for which the Y-Y' axis is orthogonal to that X-X' of said loop 6.2. These two loops 6.1 and 6.2 are sequentially supplied with power by the means 7 that are described hereafter.

Figure 5:
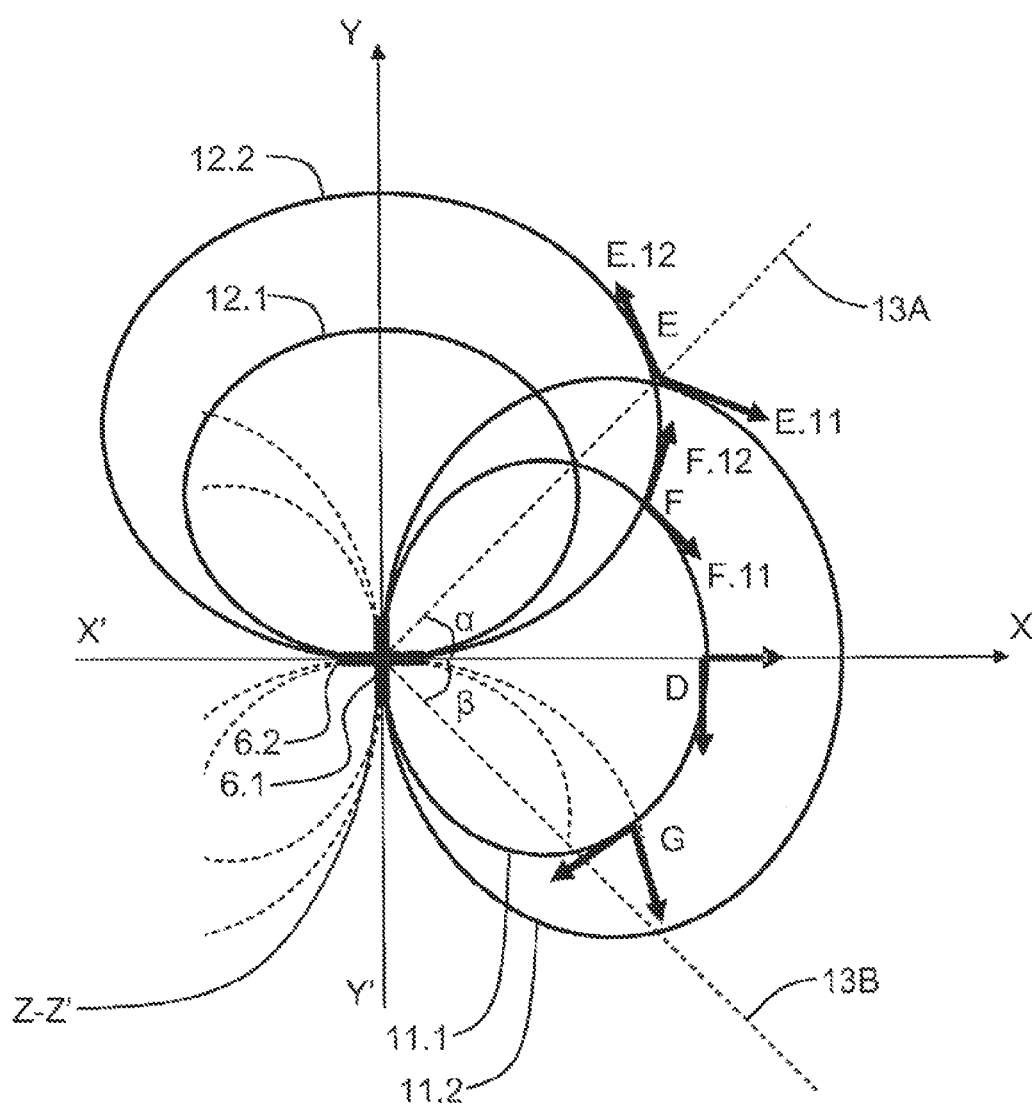
FIG. 5 is a diagram showing the spatial distribution of magnetic field lines generated by two current loops that are mutually orthogonal.

The emitting current loops 6.1 and 6.2 each generate magnetic field lines in accordance with those shown in FIG. 5 and which are described above.

The superposition of the field lines 11.1, 11.2 and 12.1, 12.2 of these two current loops is shown in FIG. 5. The loop 6.2, of axis Y-Y', generates field lines 11.1 and 11.2 in the form of closed curves to the right of the Y-Y' axis (as well as, shown by the dashed lines, the lines that are symmetrical to the lines 11.1 and 11.2 relative to the Y-Y' axis). The loop 6.1, of axis X-X', generates field lines 12.1 and 12.2 in the form of closed curves above the X-X' axis (as well as, shown by the dashed lines, the lines that are symmetrical to the lines 12.1 and 12.2 relative to the X-X' axis).

On the basis of the plurality of field lines generated by the two current loops, a set of intersection points is formed, such as points E and F. For point E, the field lines 11.2 and 12.2 respectively provide tangents E.11 and E.12 that are alternately measured by the electromagnetic receiver that is located at point E. As previously explained, on the basis of the measurement of E.11 a plurality of orientations of the emission beacon 4 exists relative to the receiver. Using the additional measurement of E.12, it is possible to determine, from this plurality of possibilities, which corresponds to the effective orientation of the emission beacon 4 relative to the electromagnetic receiver located at point E. The same applies to point F from the tangents F.11 (of the line 11.1) and F.12 (of the line 12.2), as well as for points D and G.

Therefore, on the basis of two current loops that are mutually orthogonal (and close enough to each other) forming the emission beacon 4, it is possible to have an additional parameter in order to determine the orientation of the receiver that is integrated into the item of equipment 3.

A person skilled in the art will understand that, when two orthogonal current loops are used in this manner, the points at which it is possible to determine the orientation of the electromagnetic receiver are located in an angular field that is restricted to a zone that is delimited by the axis of symmetry of one loop relative to the other loop. In the case of FIG. 5, this angular field is delimited by the axes 13A and 13B that form angles α and β that are respectively equal to 45° and −45° with the X-X' axis. An angular field for optimal operation can be [−40°; 40°] or [−35°; 35°] so as not to be at the limits of the angular field of operation of the orientation system.

A person skilled in the art will also understand that in order to carry out a measurement in a plane, for example, that is formed by the X-X' and Y-Y' axes, it is sufficient, in accordance with the invention, to have two emitting current loops that are mutually orthogonal. Furthermore, for an orientation measurement in the space, the third emitting current loop 6.3 (FIG. 3) can be used, near the other two loops 6.1 and 6.2, and for which the Z-Z' axis is orthogonal to those axes X-X' and Y-Y' of said other loops 6.1 and 6.2. The use of a pair of orthogonal loops, from the three loops 6.1, 6.2 and 6.3, thus allows the orientation of the electromagnetic receiver to be determined relative to the emission beacon 4 in the plane that is formed by the axes of the pair of considered loops, and so on for each of these three pairs of loops that are orthogonal in pairs. Furthermore, when an orientation is measured in a plane, the third measurement that is provided by the remaining current loop provides additional information (and thus a parameter), which consequently renders the orientation system according to the invention self-checking.

The function of the sequential power supply means 7 (FIG. 2) is to control the successive operation of each emitting current loop among the three current to loops 6.1, 6.2 and 6.3 (or of two of them if the observation system according to the invention only uses two). More specifically, these power supply means allow, during each phase of measuring an orientation, each emitting current loop to be successively supplied with power so that it emits an electromagnetic wave 5.1, 5.2 or 5.3, the other emitting current loops then being disposed in an open circuit. Therefore, during a measurement, the loop 6.1 is supplied with power in order to emit an electromagnetic wave 5.1 and the other two loops 6.2 and 6.3 are in an open circuit, it is then the turn of the loop 6.2 to be supplied with power and the two other loops 6.1 and 6.3 are in an open circuit, and finally the loop 6.3 is supplied with power and the other two loops 6.1 and 6.2 are in an open circuit. A similar power supply can be realised for an orientation system with only two emitting current loops or with more than three loops.

To this end, according to a preferred embodiment of these power supply means 7, said means can comprise a switching circuit, for example, in the form of a power amplifying circuit that integrates a switching function, connected to three emitting current loops 6.1, 6.2 and 6.3. (or to two of them if the observation system according to the invention only uses two), so as to sequentially switch each of said loops, said switching circuit having a high output impedance in its non-active state. Furthermore, each emitting current loop has a low stray capacitance in order to limit the effects of the generation of a stray magnetic field and to ensure that each emitting current loop has high impedance at its operating frequency.

Therefore, the electromagnetic waves that are emitted by the emitting current loops can be measured one at a time, in succession, so as to obtain distinct measurements of the magnetic field received by the electromagnetic receiver relative to each emitting current loop, in order to deduce the orientation of said receiver therefrom.

Furthermore, due to the low stray impedance of each emitting current loop, the current that circulates in a current loop cannot induce a stray magnetic field in the other current loops, which stray field would then be able to superpose itself on the field effectively generated at the supplied loop and cause interference on the orientation system.

The realisation of the functionalities of such sequential power supply means 7 notably involves the implementation of electronic switches that are within the scope of a person skilled in the art.

Figure 1:
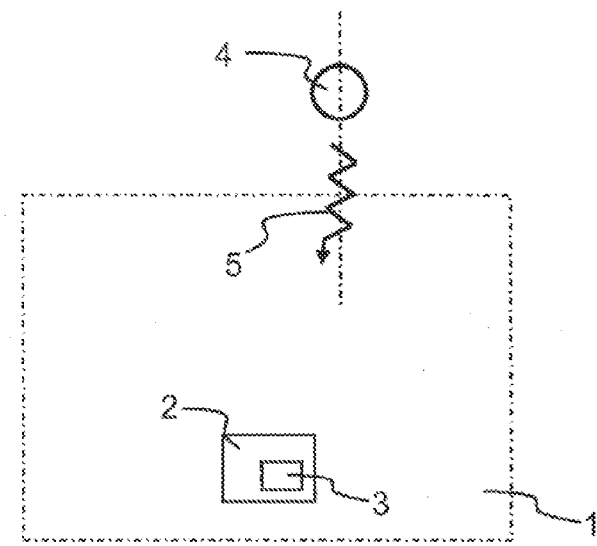
FIG. 1 is a schematic plan view showing an orientation system according to the present invention.
Figure 6:
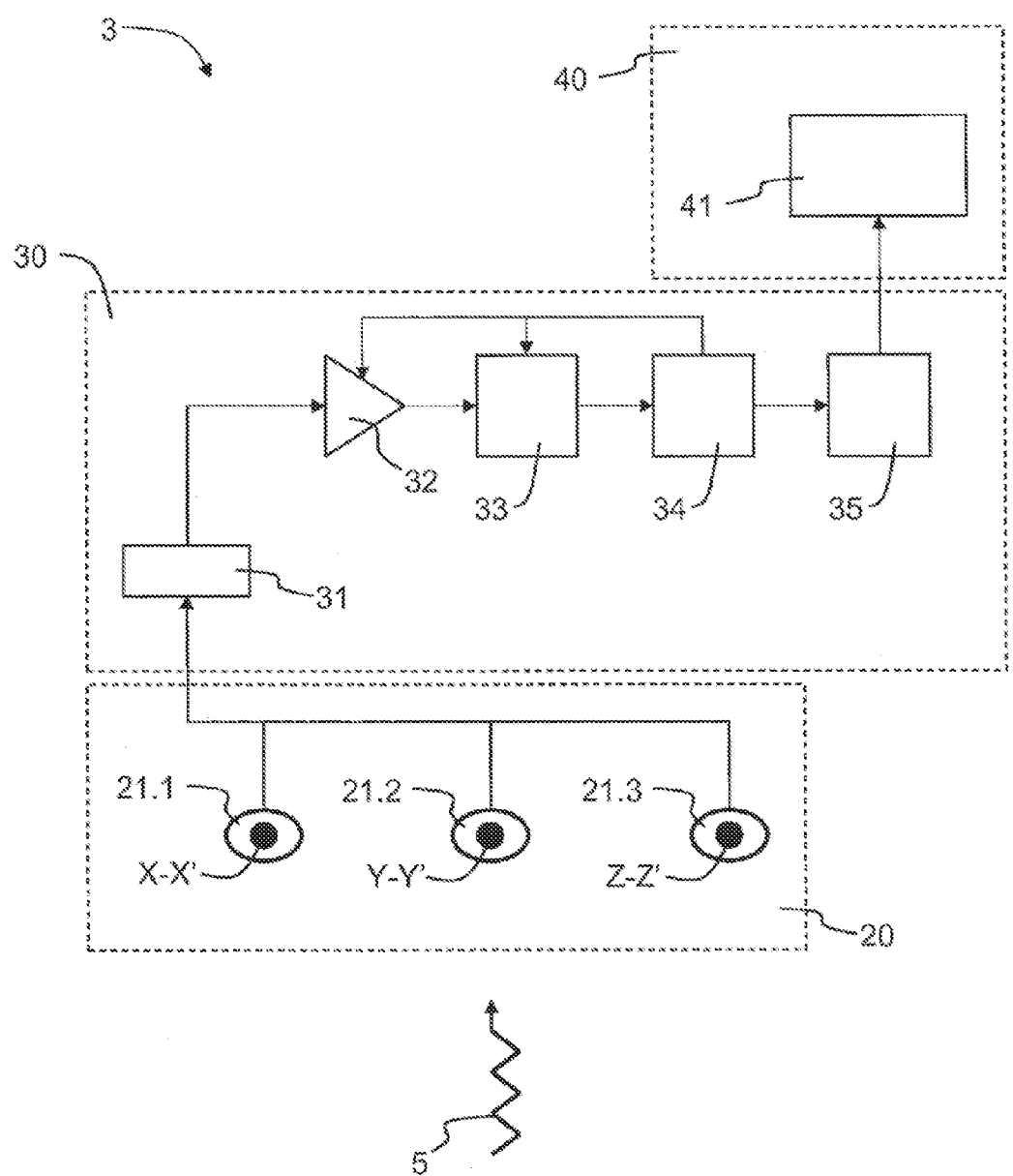
FIG. 6 shows a block diagram of an item of equipment that is provided with an electromagnetic receiver according to a particular embodiment of the invention.

In order to receive the electromagnetic waves that are emitted by the emission beacon 4 and to deduce its orientation therefrom, the orientation system according to the invention comprises an item of equipment 3, shown in FIG. 6, that integrates an electromagnetic wave receiver 20, as well as processing means 30 and means 40 for indicating the orientation of the item of equipment. This item of equipment 3 can be, for example, in the form of a portable unit that a user 2, located in a location 1 (FIG. 1), is provided with.

More specifically, the electromagnetic receiver 20 comprises at least one receiving current loop 21.1. However, the electromagnetic receiver 20 preferably comprises three receiving current loops 21.1, 21.2 and 21.3, which are disposed so that their respective axes X-X', Z-Z' and Y-Y' form a three-dimensional system of axes that are orthogonal in pairs and act as a geometric reference for the user 2 in order to cover the entire space, in a similar way to the respective orientations of the emitting current loops that are shown in FIG. 3. These electromagnetic wave-receiving antennae can be, for example, incorporated into a helmet of the user.

The processing means 30 can comprise, for each receiving loop (or in a centralised manner), a passband filter 31, an amplifier 32 and a sampler 33, respectively carrying out the filtering, the amplification and the sampling of the signals coming from the electromagnetic waves that are received by the receiver 20. The processing means 30 further comprise an analogue-digital converter 34 that receives the signals coming from the sampler 33 and directs them to computation means 35. These computation means drive the sampler 33 and, where necessary, adjust the gain of the amplifier 32.

Furthermore, these computation means 35 are capable of operating a correlation of the difference between, on the one hand, the angles that are formed (at the electromagnetic receiver) by at least two of the electromagnetic waves 5.1, 5.2, 5.3 that are respectively emitted by the current loops 6.1, 6.2, 6.3 and received by the receiver 20 and, on the other hand, the direction of the receiver 20 relative to the emission beacon 4. On the basis of the result of this correlation, the computation means 35 are then able to determine the orientation of the receiver 20 relative to the emission beacon 4.

Thereafter, the orientation that is effectively calculated is transmitted to indication means 40 that comprise a display 41 that allows the user 2 to know their orientation relative to the emission beacon 4.

Constituted thus, the orientation system according to the invention can be used, for example, to provide an indication of the orientation in the space relative to a reference at which the emission beacon 4 is disposed. This reference can be for example, a predetermined location from which the user intends to find their location.

Furthermore, the orientation system according to the invention can be easily used to determine the positioning of an electromagnetic receiver in a location. Such a positioning system, shown in FIG. 7, comprises at least two emission beacons of the same type as the emission beacon 4 that is used to form the aforementioned orientation system according to the invention, and preferably three emission beacons 4, 4A and 4B. Each individual emission beacon 4, 4A, 4B comprises at least two emitting current loops as previously described and for which the emitted electromagnetic waves further comprise information relating to the terrestrial position of the corresponding emission beacon (by means of for example, a corresponding modulation of the electromagnetic wave). These emission beacons 4, 4A and 4B are each supplied with power by specific sequential power supply means, said means being similar to the sequential power supply means 7 described above. These emission beacons 4, 4A and 4B are distributed around the location 1, outside of said location, so as to cover all of the zone 1, notably by taking into account the angular operating field [−45°; 45°] of the emitting current loops of each emission beacon.

If the position of the electromagnetic receiver needs to be determined in a location that is opaque to signals that are transmitted by satellite navigation systems, it is preferable for the emitting current loops to emit electromagnetic waves that have a high wavelength, for example, that is at least decametric.

In order to distinguish the emission beacons (or emitters) 4, 4A and 4B when receiving electromagnetic waves, the carriers of the waves that are emitted by each of these emission beacons can have different frequencies that allow them to be identified. It is also possible for the emission beacons 4, 4A and 4B to use the same carrier frequency and to incorporate an identification code for the corresponding emission beacon within the electromagnetic waves 5 that they emit.

Figure 7:
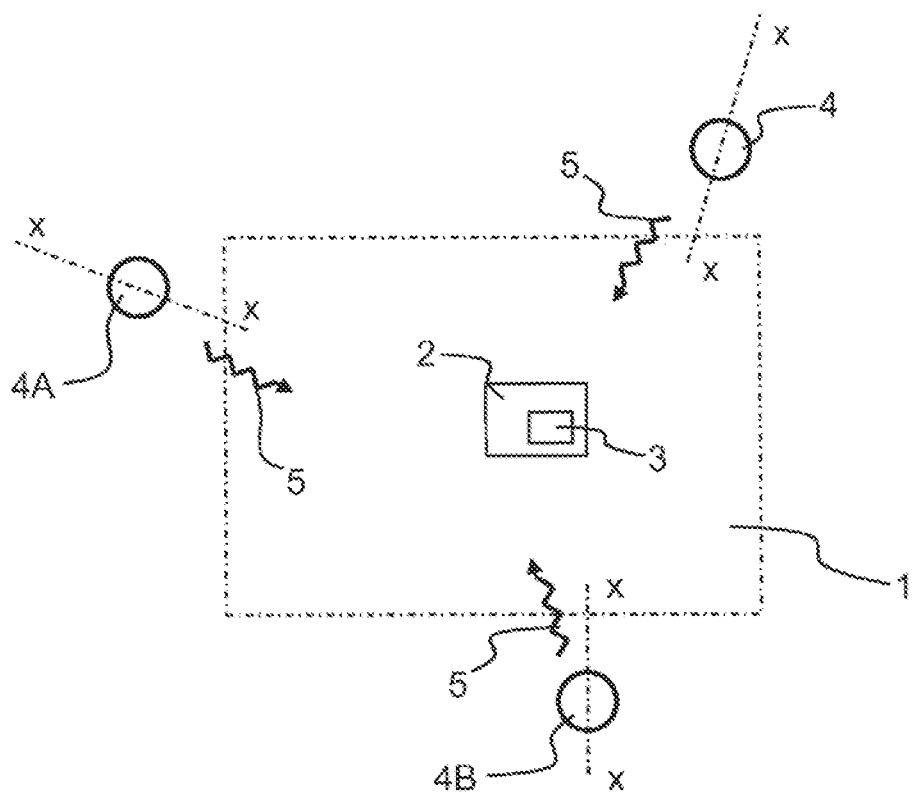
FIG. 7 is a schematic plan view showing a positioning system according to the present invention.

The electromagnetic receiver that is integrated into the item of equipment 3 of FIG. 7 is similar to that shown in FIG. 6. The processing means 30 nevertheless have distinctions, notably in that they:

correlate, for each emission beacon, between, on the hand, the difference between the angles that are formed (at the receiver 20) by the electromagnetic waves 5.1, 5.2, 5.3 that are emitted by the emitting current loops 6.1, 6.2, 6.3 and that are received by the electromagnetic receiver 20 and, on the other hand, the direction of said receiver 20 relative to the emission beacon 4, determine the orientation of the electromagnetic receiver 20 relative to each emission beacon 4 on the basis of said correlation, and determine the position of the electromagnetic receiver 20 in the location 1 on the basis of said orientations and the terrestrial position of these emission beacons 4, 4A, 4B.

Therefore, the positioning system according to the invention can be used to determine the position of an electromagnetic receiver 20 (or a user 2) in a location 1 that is likely not to receive signals transmitted by satellite navigation systems.

It will be understood that, in the aforementioned system, the use of three emission beacons of the same type as the emission beacon 4 constitutes a preferred variant of the invention, the purpose of which is to allow precise positioning of the electromagnetic receiver. Nevertheless, it goes without saying that two individual emission beacons of the same type as the emission beacon 4, suitably disposed around the location 1, also allow the receiver to be positioned insofar as, on the one hand, each of the two individual emission beacons provides information relating to the orientation of said receiver relative to said individual emission beacon and where, on the other hand, the position of said receiver is located at the intersection of the two straight lines that correspond to the respective orientations of these two individual emission beacons.

It is noteworthy that the systems for orienting and positioning according to the invention can be combined in order to form a system that is capable of determining both the orientation of an electromagnetic receiver relative to a reference where at least one of the emission beacons is disposed and the positioning of said receiver on the basis of measurements of the orientation of the receiver relative to each emission beacon.

It is also noteworthy that although the aforementioned invention has been described for a single user 2, it can, needless to say, be applied to a plurality of users found in the location 1 and each provided with suitable electromagnetic receivers. Of course, the invention can be applied to more than three emission beacons and also to more than three emitting current loops for each emission beacon and, likewise, to a different number of emitting current loops for each emission beacon.

The invention claimed is:

1. System (3, 4) for orienting an electromagnetic receiver (20), in a location (1) where the signals from satellite navigation systems cannot be received, relative to an emission beacon (4) that is disposed around said location (1), outside of said location, wherein said emission beacon (4) comprises:
at least two emitting current loops (6.1, 6.2, 6.3) that are mutually orthogonal and are capable of emitting electromagnetic waves (5.1, 5.2, 5.3), and
means (7) for sequentially supplying power to said emitting current loops (6.1, 6.2, 6.3),
wherein the electromagnetic receiver (20) is associated with means (30) for processing the electromagnetic waves (5.1. 5.2, 5.3) that are emitted by the emitting current loops (6.1, 6.2, 6.3) and received by said electromagnetic receiver (20), said processing means (30) being capable of:
correlating the difference between the angles that are formed by said electromagnetic waves (5.1, 5.2, 5.3), at the electromagnetic receiver (20), with the direction of said receiver (20) relative to the emission beacon (4), and
determining the orientation of the electromagnetic receiver (20) relative to the emission beacon (4) on the basis of said correlation.

2. System according to claim 1, wherein the sequential power supply means (7) are arranged so that, during each sequential power supply phase, each emitting current loop (6.1, 6.2, 6.3) is successively supplied with power so as to emit an electromagnetic wave (5.1, 5.2, 5.3), the other emitting current loops being disposed in an open circuit.

3. System according to claim 1, wherein the sequential power supply means (7) are provided with at least one switching circuit that is arranged to sequentially switch each of said emitting current loops (6.1, 6.2, 6.3).

4. System according to claim 1, wherein the sequential power supply means (7) are arranged so that, during each sequential power supply phase, the successive power supply of said emitting current loops (6.1, 6.2, 6.3) occurs at a predetermined rate as a function of a possible displacement of said electromagnetic receiver (20).

5. System according to claim 1, wherein the emission wavelength of each emitting current loop (6.1, 6.2, 6.3) is at least decametric.

6. System according to claim 1, wherein the number of emitting current loops (6.1, 6.2, 6.3) of the emission beacon (4) is two.

7. System according to claim 1, wherein the number of emitting current loops (6.1, 6.2, 6.3) of the emission beacon (4) is three.

8. System (3, 4) for orienting an electromagnetic receiver (20), in a location (1) where the signals from satellite naviation systems cannot be received relative to an emission beacon (4) that is disposed around said location (1), outside of said location, wherein said emission beacon (4) comprises:
at least two emitting current loops (6.1, 6.2, 6.3) that are mutually orthogonal and are capable of emitting electromagnetic waves (5.1, 5.2, 5.3), and
means (7) for sequentially supplying power to said emitting current loops (6.1, 6.2, 6.3).
wherein the system is designed to position (3, 4) said electromagnetic receiver (20) in a location (1), wherein:
said system comprises at least one additional emission beacon (4A, 4B), comprising:
at least two emitting current loops (6.1, 6.2, 6.3) that are mutually orthogonal and are capable of emitting electromagnetic waves (5.1, 5.2, 5.3), and means (7) for sequentially supplying power to said emitting current loops (6.1, 6.2, 6.3), the set of emission beacons (4, 4A, 4B) being distributed around the location (1), and outside of said location, the electromagnetic waves (5.1, 5.2, 5.3) that are emitted by each emission beacon (4, 4A, 4B) comprising information relating to the terrestrial position of said emission beacon (4), and said processing means (30) are capable of:

correlating, for each emission beacon (4, 4A, 4B), the difference between the angles that are formed by the electromagnetic waves (5.1, 5.2, 5.3), at the electromagnetic receiver (20), with the direction of said electromagnetic receiver (20) relative to the corresponding emission beacon (4), determining the orientation of the electromagnetic receiver (20) relative to each emission beacon (4, 4A, 4B) on the basis of said correlation, and determining the position of the electromagnetic receiver (20) in the location (1) on the basis of said orientations and the terrestrial position of each emission beacon (4, 4A, 4B).

9. Emission beacon (4) designed to equip an orientation system (3, 4; 3, 4, 4A, 4B) according to claim 1.

10. System according to claim 8, wherein the sequential power supply means (7) are arranged so that, during each sequential power supply phase, each emitting current loop (6.1, 6.2, 6.3) is successively supplied with power so as to emit an electromagnetic wave (5.1, 5.2, 5.3), the other emitting current loops being disposed in an open circuit.

11. System according to claim 8, wherein the sequential power supply means (7) are provided with at least one switching circuit that is arranged to sequentially switch each of said emitting current loops (6.1, 6.2, 6.3).

12. System according to claim 8, wherein the sequential power supply means (7) are arranged so that, during each sequential power supply phase, the successive power supply of said emitting current loops (6.1, 6.2, 6.3) occurs at a predetermined rate as a function of a possible displacement of said electromagnetic receiver (20).

13. System according to claim 8, wherein the emission wavelength of each emitting current loop (6.1, 6.2, 6.3) is at least decametric.

14. System according to claim 8, wherein the number of emitting current loops (6.1, 6.2, 6.3) of the emission beacon (4) is two.

15. System according to claim 8, wherein the number of emitting current loops (6.1, 6.2, 6.3) of the emission beacon (4) is three.

16. Emission beacon (4) designed to equip an orientation system (3, 4; 3, 4, 4A, 4B) according to claim 8.

* * * * *